United States Patent [19]
Khare et al.

[11] Patent Number: 5,166,121
[45] Date of Patent: Nov. 24, 1992

[54] CATALYTIC COMPOSITIONS

[75] Inventors: Gyanesh P. Khare, Bartlesville, Okla.; Roland von Ballmoos, Belle Meade, N.J.

[73] Assignee: Engelhard Corporation, Woodbridge, N.J.

[21] Appl. No.: 732,422

[22] Filed: Jul. 16, 1991

Related U.S. Application Data

[63] Continuation of Ser. No. 525,610, May 21, 1990, abandoned.

[51] Int. Cl.$^5$ ............................................. B01J 27/122
[52] U.S. Cl. ................................... 502/225; 502/227; 502/230
[58] Field of Search ........................ 502/225, 227, 230

[56]  References Cited

U.S. PATENT DOCUMENTS

| | | | |
|---|---|---|---|
| 3,948,804 | 4/1976 | Rausch | 502/227 |
| 4,082,651 | 4/1978 | Antos | 502/230 |
| 4,301,037 | 11/1981 | Sanchez et al. | 252/462 |

Primary Examiner—Patrick P. Garvin
Assistant Examiner—Brent M. Peebles

[57] ABSTRACT

A catalytic composite comprising a combination of catalytically effective amounts of a platinum component, optionally a second metal component such as tin or rhenium, and a halogen component with a porous carrier support material is disclosed. The platinum, second metal (if present) and halogen components are present in the catalytic composite in amounts, calculated on an elemental basis, of about 0.2 to about 0.4 wt. percent platinum metal, about 0.2 to about 0.5 wt. percent the second metal, and 0.5 to about 1.5 wt. percent halogen. Moreover, the metallic components are substantially uniformly distributed throughout the porous carrier support material. The support material is spherical gamma alumina having a characteristic pore structure including "superpores" (200-10,000 nm or greater) interconnected with "mesopores" (5-20 nm), wherein 80% or more of the pore volume ($N_2$) resides in pores of less than 150 Å.

The principal use of the catalytic composite of the present invention is for hydrocarbon conversion, particularly in the reforming of a gasoline fraction.

11 Claims, 9 Drawing Sheets

CATALYTIC COMPOSITIONS

This is a continuation, of application Ser. No. 07/525,610, filed May 21, 1990, entitled CATALYTIC COMPOSITIONS, now abandoned.

FIELD OF THE INVENTION

The present invention relates to catalytic composites or reforming catalysts, useful for the conversion of hydrocarbon streams. More particularly, the present invention relates to platinum catalysts and bimetallic catalysts of platinum and a second metal uniformly distributed on a unique spherical alumina support and to the use of the resulting catalytic composites in hydrocarbon conversion processes, particularly the reforming of low octane gasoline fractions to produce high octane reformate products.

BACKGROUND OF THE INVENTION

Platinum catalysts and bimetallic catalytic composites of platinum and other metals, such as tin, on a refractory support are well known. See, e.g., U.S. Pat. No. 3,531,543 (Clippinger et al.), U.S. Pat. No. 3,745,112 (Rausch), U.S. Pat. No. 3,840,475 (Davis), U.S. Pat. No. 3,864,241 (Rausch), and U.S. Pat. No. 3,883,419 (Itoh et al.). The platinum, which is typically present in amounts of 0.1 to 5% by weight, is an active catalyst for hydrogenation or dehydrogenation and dehydrocyclization of vaporized hydrocarbons under appropriate process conditions; and deposited on suitable porous supports, platinum also is known to catalyze isomerization and cracking. Bimetallic catalysts, in which a second metal such as tin, cobalt, nickel, iron, copper, palladium, germanium, iridium, rhodium, rhenium etc. is used to stabilize or enhance the platinum activity, have been developed in order to prevent agglomeration of the platinum, facilitate regeneration and enhance selectivity, or, as in the case of rhenium, to reduce the amount of expensive platinum metal required to produce an active hydrocarbon conversion catalyst.

Bimetallic catalytic composites comprising a combination of catalytically effective amounts of platinum, a second metal (particularly tin) and a halogen component on a porous carrier material have been developed which exhibit good activity, selectivity and stability when utilized in hydrocarbon reforming processes.

Reforming of hydrocarbon naphtha streams is a particularly important hydrocarbon refining process in which high octane hydrocarbon blending components for gasoline or for chemical processing feedstocks are obtained from low octane petroleum fractions. Catalytic reforming of naphthas has been performed with a wide range of platinum-containing catalysts in fixed and moving bed processes.

In the manufacture of reforming catalysts, many factors are considered with a view to optimizing the volume of high octane materials produced using a particular catalyst. For example, the amounts and types of metals combined with the platinum may be varied, as well as the chemical nature of the bimetallic combination, that is, whether the deposited metals are in a positive oxidation state, elemental, or form a solid solution (alloy). See, e.g., U.S. Pat. No. 4,016,068 (Rausch) and U.S. Pat. No. 3,759,823 (Davies et al.).

In addition to varying the amount of platinum or the types and content of any other metallic components, the physical properties of the catalyst support may also be varied with a view to altering the overall properties of the catalytic composite. See, e.g., U.S. Pat. No. 4,703,031 (Unmuth et al.).

Applicants have found that formation of an improved catalytic composite comprising a combination of elemental platinum, or elemental platinum and a second metal in elemental form selected from tin, cobalt, nickel, iron, copper, palladium, germanium, iridium, rhodium or rhenium, and a halogen component, uniformly deposited on a unique porous, high surface area, spherical alumina carrier such that the platinum and tin components are uniformly dispersed throughout the porous carrier support material, provides an improved reforming catalyst having activity, selectivity and stability characteristics so that the average yields of $C_{5+}$ reformate over a cycle are increased and the operation of the catalyst at high severity conditions is improved over catalytic composites prepared according to the prior art. Catalytic composites prepared as described herein, therefore, represent an advance in the art by enabling more efficient naphtha reforming processes and producing higher quality gasolines and chemical processing feedstocks.

SUMMARY OF THE INVENTION

The present invention provides an improved catalytic reforming catalyst, and a process for using it, which can be employed for conversion of hydrocarbons such as naphthas into more valuable products.

It is an object of the present invention, therefore, to provide a catalytic hydrocarbon reforming catalyst that possesses increased activity for the production of $C_{5+}$ materials from naphtha feedstocks while maintaining selectivity for the production of high octane $C_{5+}$ materials.

It is a further object of the invention to provide a catalytic reforming process using the catalytic composites described herein.

It is a further object of the present invention to provide a hydrocarbon reforming catalyst and process in which a particular type of refractory support having characteristic surface area, pore volume and distribution of pore volume results in a catalytic composite having increased activity when compared to prior art catalysts, increased selectivity for the production of high octane $C_{5+}$ gasoline materials, and increased stability both in-cycle and after regeneration.

DETAILED DESCRIPTION OF THE INVENTION

Figure 1:
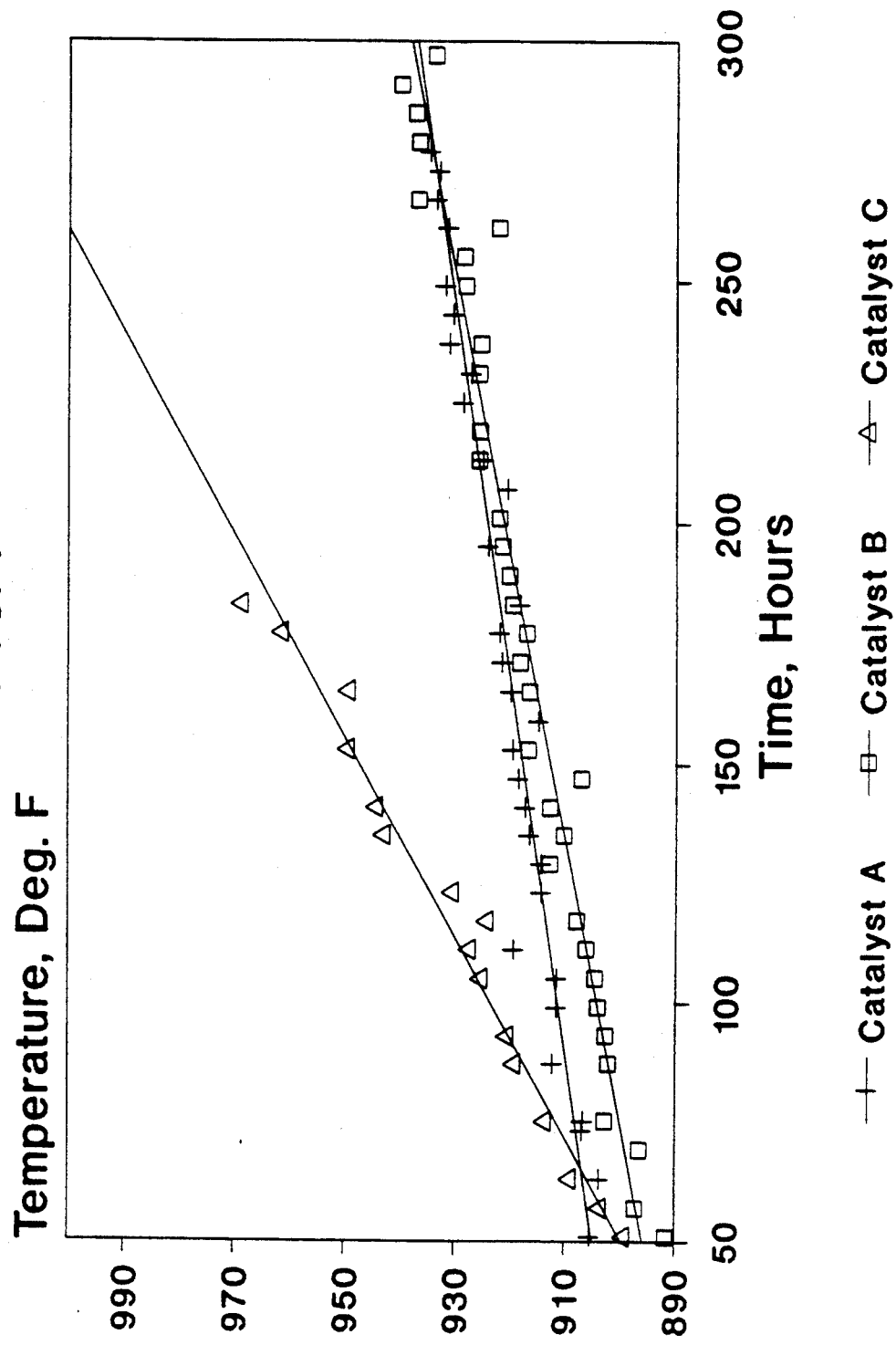
FIG. 1 depicts the catalytic performance of a bimetallic platinum-tin catalytic composite according to the present invention as compared with a conventional platinum-tin catalyst and a conventional platinum-tin catalyst on a spherical alumina support, the plot showing average reaction temperature required to maintain a product of 98 RON over time.

The catalytic composites of the present invention exhibit good activity, selectivity and stability in catalytic reforming operations.

In a reforming process, activity typically refers to the amount of conversion that takes place for a given stock at a specified severity level and is typically measured by octane number of the $C_{5+}$ product stream; selectivity usually refers to the relative amount of $C_{5+}$ yield that is obtained at the particular severity level; stability is typically equated with the rate of change with time of activity, as measured by octane number of $C_{5+}$ yield. A conventional continuous reforming process may be operated to produce a constant octane $C_{5+}$ product with a severity level being continuously adjusted to attain this result; and, further, the severity level for this process is usually varied by adjusting the conversion temperatures in the reaction zones such that the rate of change of activity finds response in the rate of change of conversion temperatures, and changes in this latter parameter are customarily taken as indicative of catalyst stability.

The catalytic composites of the present invention may be used to reform feedstocks, such as virgin or cracked naphthas or other hydrocarbon fractions that boil in the boiling range of gasoline. Since increased yields of high octane reformate or extended activity in use are highly desirable outcomes from a reforming catalyst, the catalytic composites of the present invention represent an advance in the hydrocarbon conversion art. The catalytic composites described herein demonstrate significantly greater $C_{5+}$ yields and a corresponding decrease in light gaseous products than that of catalysts used in similar processes heretofore. The higher $C_{5+}$ yield may be due to a decreased amount of secondary cracking of primary hydrocarbon products such as naphthenes and alkyl aromatics. The decrease in the cracking side reaction may be the result of the unique dimensions and distributions of the pores and "superpores" of the spherical alumina supports of the present invention described below.

The catalytic composites of the present invention comprise a combination of a platinum component and a halogen component with a porous carrier material. Optionally, and preferably, a second metallic component such as tin, cobalt, nickel, iron, germanium, palladium, copper, rhodium or rhenium (most preferably tin or rhenium) is also included. The platinum, second metal (if present) and halogen components are present in the catalytic composite in amounts sufficient to result in the composite containing, on an elemental basis, at least about 0.06 to about 2 weight percent of platinum, at least about 0.1 to about 5 weight percent of the second metal, and at least about 0.1 to about 3.5 weight percent halogen. Furthermore, the metallic components are substantially uniformly distributed throughout the porous carrier material, and in a finished catalyst (i.e., catalyst ready to use in a reforming process) the oxidation state of the platinum is adjusted to result in a composite having substantially all of the platinum component present as the elemental metal.

A preferred embodiment of the present invention is a catalytic composite comprising a platinum component, a tin component, and a chlorine component substantially uniformly distributed on a porous spherical alumina support. The components are present in amounts sufficient to result in the composite containing on an elemental basis, about 0.2–0.4 wt. % of platinum, about 0.2–0.5 wt. % tin, and about 0.5–1.5 wt. %, most preferably about 0.8–1.2 wt. %, chlorine. Moreover, the tin and platinum components are uniformly distributed throughout the alumina carrier, and in the finished catalyst the oxidation state of the platinum component is adjusted so that substantially all of the platinum is present as the elemental metal.

A further embodiment of the present invention relates to a catalytic composite comprising a platinum component, a rhenium component, and a chlorine component with an alumina support. The components are present in amounts sufficient to result in the composite containing on an elemental basis about 0.2–0.4 wt. % of the platinum metal, about 0.1–0.5 wt. % rhenium, and about 0.6–1.2 wt. % chlorine. Moreover, the platinum and rhenium are uniformly distributed throughout the alumina carrier, and in the finished catalyst the oxidation state of the platinum component is adjusted so that substantially all of the platinum is present as elemental platinum.

A further specific embodiment of the present invention relates to a catalytic composite comprising platinum as the only metallic component and a halogen component deposited on an alumina support. The components are present in amounts sufficient to result in the finished composite containing, on an elemental basis, about 0.2–0.4 wt. % of the platinum metal, and about 0.6–1.2 wt. % chlorine. The platinum component is uniformly distributed throughout the alumina carrier, and in the finished catalyst the oxidation state of the platinum is adjusted so that substantially all of the platinum is present as the elemental metal.

In bimetallic catalysts, co-deposition techniques or other methods aimed at evenly distributing the metallic components may result in a significant amount (e.g., greater than 10%) of the metallic components being present in the form of a solid solution or alloy. For instance, using Moessbauer spectroscopy, it is estimated that platinum-tin catalysts prepared as described herein may have up to 30 wt. % or more of the metallic components in the form of an alloy, such as $Pt_3Sn$. The presence of bimetallic alloys is generally regarded as desirable, however the presence of an alloy is extremely difficult to confirm. While not wishing to be limited to a particular elemental form, as analytical techniques improve it may be observed that the bimetallic embodiments of this invention have at least a portion of the metallic components in the form of one or more alloys.

When the bimetallic catalyst is to be used in a reforming process, one of its significant advantages is its ability to operate in a stable manner under high severity conditions, for example, a continuous reforming process producing a $C_{5+}$ reformate having an octane of about 100 F-1 clear and utilizing a relatively low pressure of about 50 to about 350 psig. The second metallic component is believed to stabilize/enhance the platinum component and to make the catalyst more resistant to the severe deactivation conditions.

The catalytic composites of the present invention are further comprised of a porous alumina carrier, having combined therewith catalytically effective amounts of platinum and optionally a second metal (preferably tin or rhenium) and a halogen component (preferably chlorine or fluorine) in the proportions and forms described previously. The porous alumina carrier utilized in the present invention is spherical gamma alumina having a BET surface area of at least about 170 to about 240 $m^2/g$.

The porous carrier support material should be relatively refractory to the hydrocarbon conversion process conditions. Suitable spherical aluminas therefore will preferably have a crush strength (1b/sph) of at least 8, and most preferably 10 or higher, as measured on a Chatillon crush strength tester. Morphologically, the alumina spheres suitable for use herein will have a pore structure distinguished by two types of pores, i.e., "superpores", having an average pore diameter of about 200-10,000 nm or greater, and "mesopores" interconnecting the superpores, having an average pore diameter of about 5-20 nm. The superpores are generally spherical in shape and on microscopic examination may be readily distinguished from the cracks, voids a fissures of conventional porous alumina materials. Scanning electron micrographs of alumina spheres according to the present invention (A) compared with conventional extruded (B) and spherical (C) alumina supports illustrates this difference. From these electron micrographs, it can be seen that the cross-sectioned superpores of support A are round, bubble-shaped pores, whereas supports B and C exhibit jagged cracks and voids. While not wishing to be bound by any theory, it is believed that the superpores may be derived in the formation process by employing a blowing agent or other additive. However, any spherical alumina formation process resulting in the characteristic superpores is suitable. The superpores are interconnected by the much smaller mesopores, which have an average diameter of about 5-20 nm. The mesopores serve to make the superpores part of a continuous porous network throughout each alumina sphere, and they may contribute to catalyst longevity by providing a multiplicity of flow routes for reformate hydrocarbon molecules. While not wishing to be bound to a particular scientific theory, it is believed that the mesopores contain the sites of the reforming reactions, while the superpores enhance the rate of diffusion of the reactant molecules through the spheres to the reactive sites.

Figure 7:
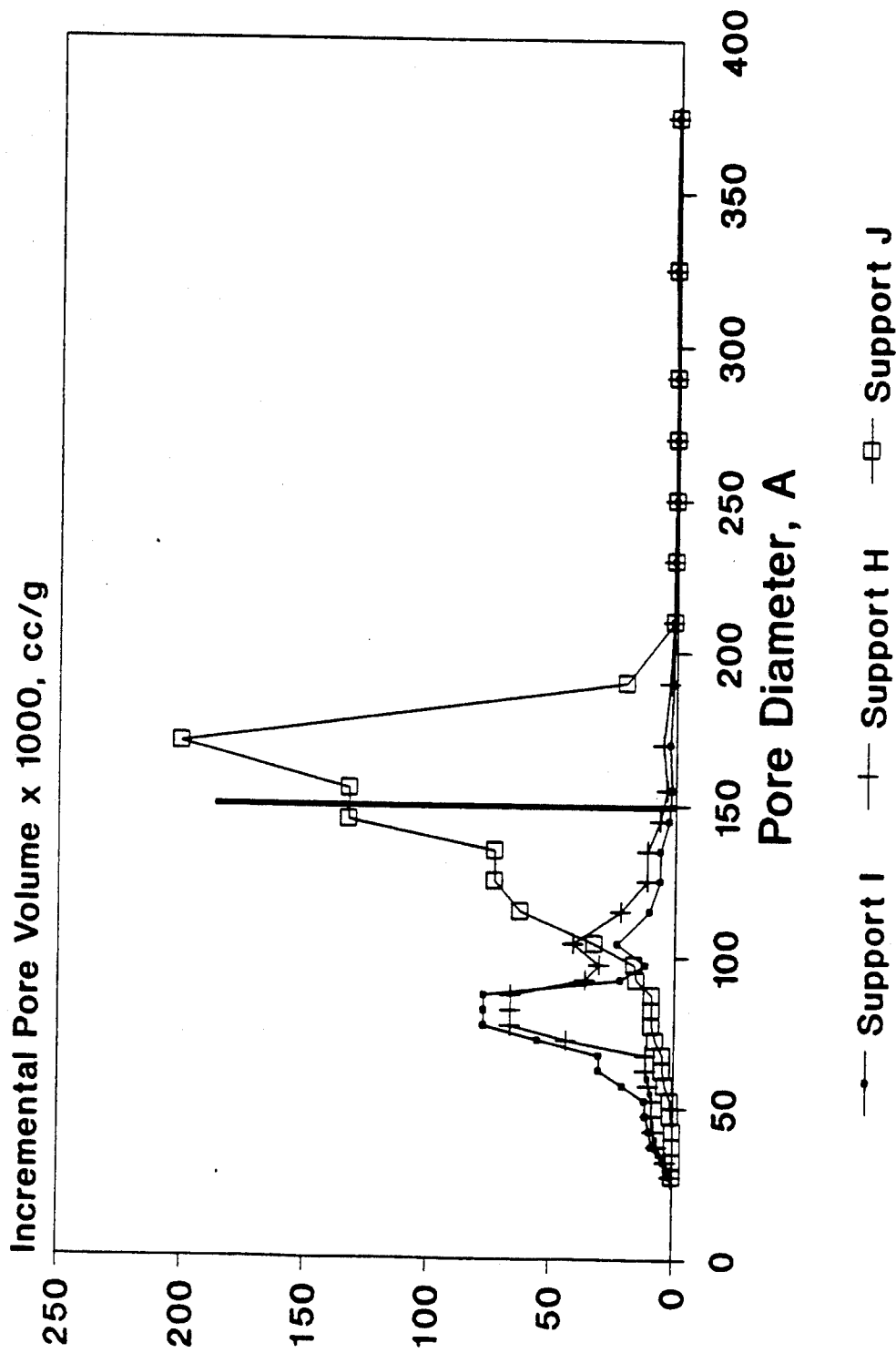
FIG. 7 shows nitrogen pore size distribution curves for spherical alumina supports suitable for use in the present invention, one having high surface area (curve H; 215 m$^2$/g) and one having comparatively low surface area (curve I; 185 m$^2$/g), compared with a conventional spherical alumina support (curve J).
Figure 8:
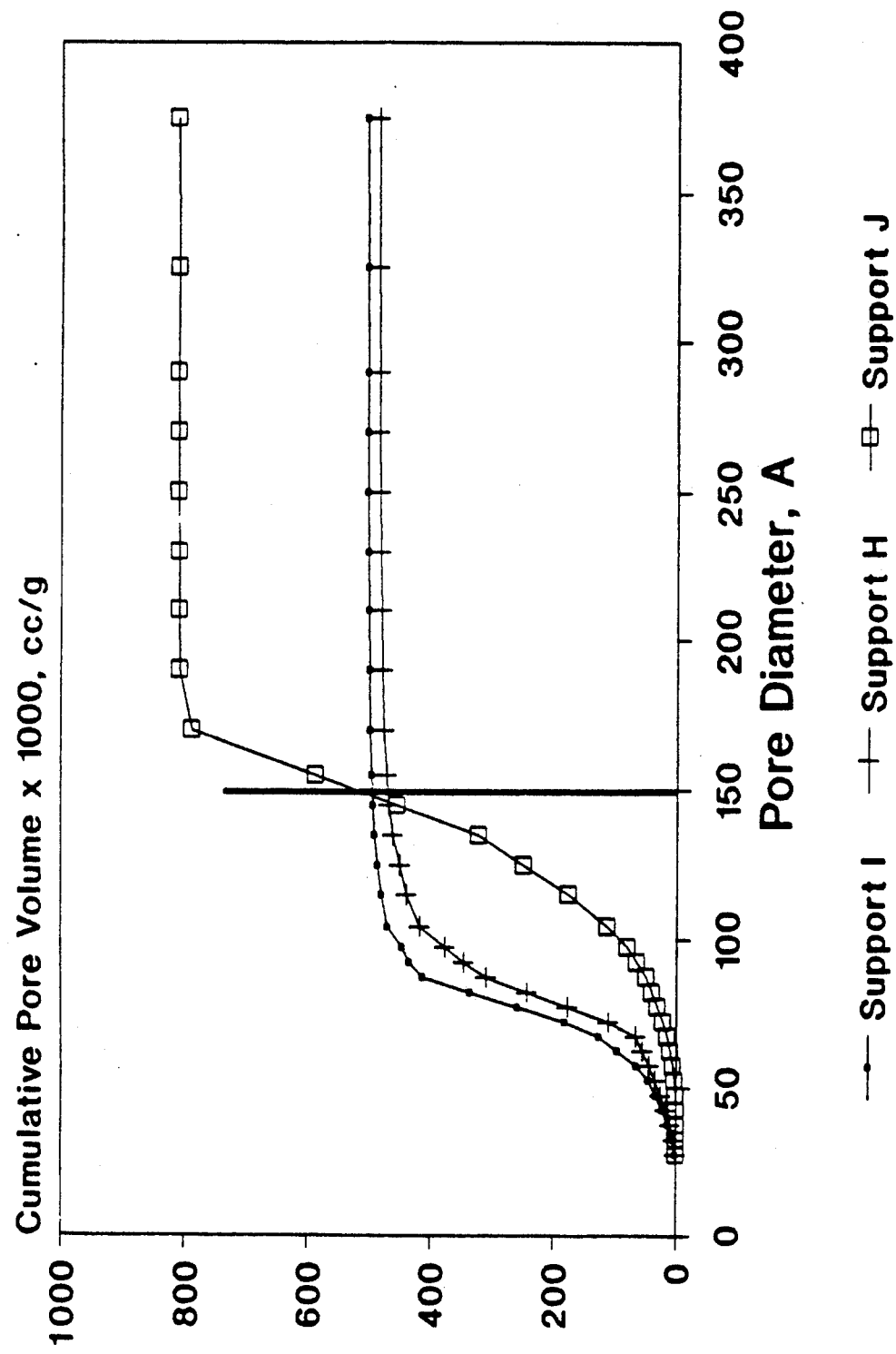
FIG. 8 shows cumulative nitrogen pore volume curves for spherical alumina supports suitable for the catalytic composites of this invention, one having high surface area (curve H; 215 m$^2$/g) and one having comparatively low surface area (curve I; 185 m$^2$/g), compared with a conventional spherical alumina support (curve J).
Figure 9:
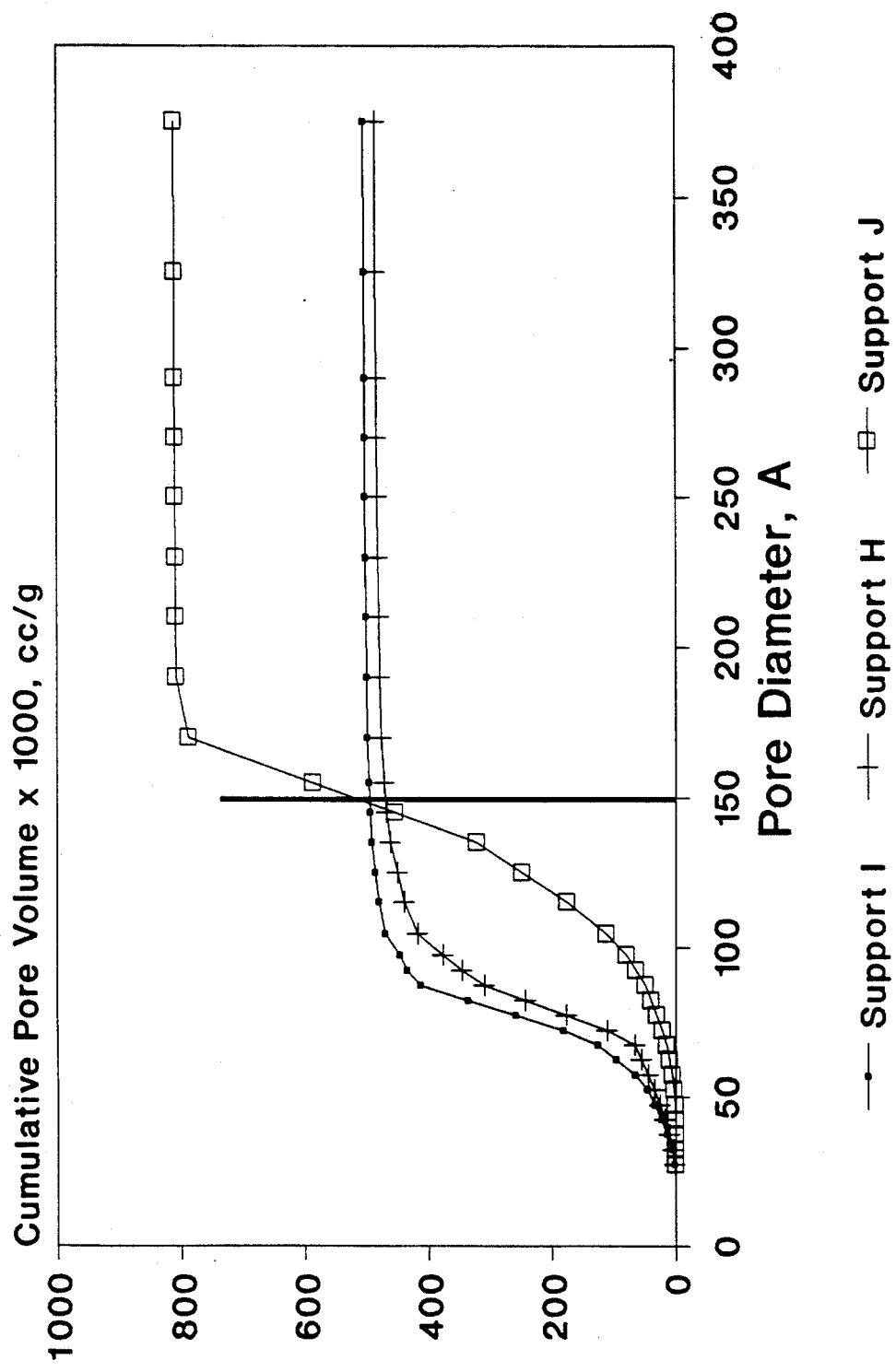

The porous spherical aluminas useful in preparing catalytic composites of this invention will also exhibit characteristic pore size distribution, wherein a major proportion of the incremental pore volume resides in relatively small pores. FIG. 7 illustrates the difference in pore size distribution between supports suitable for the purposes herein and conventional spherical alumina supports. As seen from FIG. 7, the nitrogen pore size distribution curve of supports of the type useful in the present invention (H and I) is distinguished by a pronounced peak corresponding to relatively small pore diameters (i.e., in the range of about 40-150 Å). In contrast, conventional aluminas such as Alcoa XA-139SG (curve J) exhibit a much broader distribution of incremental pore volume over a wider range of pore diameters, or exhibit a much greater total pore volume distributed in a peak corresponding to relatively larger pore diameters (i.e., greater than 150 Å). The spherical alumina supports of the present invention will have at least about 80% of their total pore volume, most preferably 90% or more, as measured by nitrogen porosimetry, residing in pores of less than 150 Å.

The unique pore structure of the alumina supports used herein, having a combination of extremely large pores and very small pores, leads to the materials exhibiting different total pore volume values depending on the method of measurement employed. Using conventional mercury porosimetry, the total pore volume of the alumina supports of this invention are about 0.6 to about 0.95 cc/g (most preferably 0.7-0.8 cc/g); using nitrogen porosimetry, the total pore volume of the same support material will be about 0.35 to about 0.65 cc/g (most preferably 0.45-0.55 cc/g). It will be recognized by those skilled in the art that the pore volume associated with the superpores is not detected by nitrogen porosimetry, which accounts in part for the bulk of the apparent total pore volume being distributed over pores of less than 150 Å (see FIG. 7). Nitrogen does not fill the superpores under the conditions employed herein for the porosimetry measurement. If different conditions were chosen the superpores could be gradually filled even by nitrogen, and the nitrogen total pore volume for the supports according to the present invention could be made to approach the mercury total pore volume. Mercury porosimetry and nitrogen porosimetry measurements of total pore volume of conventional spherical alumina materials (without superpores) will be essentially the same.

The prominence of the superpores in the alumina materials useful in preparing the catalytic composites of the present invention (as can be seen from electron micrographs of such materials) allows accurate measurement of the fractional surface taken up by superpores in any cross-sectional area of a plane through an alumina microsphere. From such electron micrographs the areas of the micrographs image representing superpores can be traced, and the 2-dimensional superpore area can be accurately calculated in an image analyzer. The spherical alumina materials useful in the present invention will have a fractional surface of 0.2-0.7, preferably 0.3-0.5, accounted for by superpores. That is, 20-70% (preferably 30-50%) of the cross-sectional area of the spherical aluminas of the present invention will be within superpores.

One example of the unique spherical alumina support suitable for preparing the catalytic composites of the present invention is Spheralox ™, available from Condea Chemie (Hamburg, West Germany). In addition to the properties already described, such materials typically have spherical particles of about, e.g., 12×14 mesh and an apparent bulk density of at least about 0.3 to about 0.65 g/cc, most preferably about 0.54–0.58 g/cc.

In the foregoing description, surface area, pore volume, pore size, pore distribution, crush strength and other characteristics are measured by standard techniques used in the hydrocarbon conversion catalyst industry. For example, the surface area of the composites was calculated using multiple-point/single-point BET techniques using a digisorb Analyzer (Micromeritics Instrument Corp.), as described in, e.g., Brunauer et al., J. A. C. S., 60, 309 (1938). The surface area ranges noted above are for "fresh" catalytic composites, i.e., unused (or "start-of-cycle") finished catalyst.

The pore volume, pore size and pore distribution measurements were made using mercury porosimetry and nitrogen porosimetry techniques following the procedures of ASTM D4284-88 and ASTM D4222-83. The mercury porosimetry data were generated using a Quantachrome Autoscan 60 mercury porosimeter and a wetting angle of 140°. Nitrogen porosimetry data were generated on either an automated Autosorb-6 or an ASAP 2400 instrument.

Crush strength was evaluated on a Chatillon crush strength tester.

SEM micrographs were prepared by crushing the alumina spheres and scanning the exposed fractured interior cross-section with an ISI ES130 Scanning Electron Microscope.

Except for surface area, which is measured on fresh catalyst, the characteristics of the alumina support reported above are characteristics of the support as obtained from the manufacturer, and in preparing the catalytic composites according to the invention, care should be taken to maintain the crush strength and the pore volume, pore dimensions and pore distribution of the untreated support.

The catalytic composites according to the invention may be prepared using any of the many known techniques for impregnating porous alumina supports which are effective to deposit the metallic ingredients substantially uniformly throughout the support. References to the metallic ingredients being "substantially uniformly distributed" mean that a cross-section of a spherical particle of the finished catalytic composite material will exhibit an even distribution of each metallic element across the entire sectional plane, that is, the average concentration of elemental platinum and any other metal atoms does not vary more than 20% from the center of the spherical particle to the outer surface. Thus, the metallic components are both uniformly distributed and highly dispersed throughout the support materials. Also, as mentioned previously, the process for preparing the catalytic composite should not substantially alter the crush strength or pore volume, pore sizes, or pore distribution of the spherical alumina support.

The platinum, any other metal components and halogen components may be deposited in the carrier material separately or simultaneously. However, because a particular object of the present invention is to obtain uniform distribution of the components and because partial alloying of the metallic components is desirable, simultaneous deposit of the platinum and any optional second metal is preferred.

The catalytic composites of the present invention may be prepared, generally, by preparing an impregnating solution of a platinum compound and a compound of the second metal, if desired, in sufficient water to achieve incipient wetting of the alumina carrier material, impregnating the carrier material with the impregnating solution, drying and calcining the impregnated carrier material. Preferred techniques for co-depositing platinum metal and a second metal in a spherical alumina carrier are described in U.S. Pat. No. 3,759,841 (Wilhelm), incorporated herein by reference. Preferably, the impregnating solution contains a buffer, such as a weak acid, in order to maintain the pH of the impregnating solution during the impregnating step and to facilitate uniform distribution of the metal(s) throughout the spheres. Oxalic acid is preferred. Other weak acids may also be used, such as formic acid, acetic acid, citric acid, and other acids having a high dissociation constant, it being most preferred to employ acids which will burn off completely in the calcining steps without leaving carbonaceous deposits which foul the catalytic surfaces of the finished composites.

Suitable platinum compounds for use in the common impregnating solution include chloroplatinic acid, platinum chloride, ammonium chloroplatinate, dinitrodiamino platinum, and the like. Chloroplatinic acid is preferred. For the optional second metallic component, suitable compounds include stannic chloride, stannous chloride, rhenium trichloride, perrhenic acid, ammonium perrhenate, and the like. Stannous chloride and ammonium perrhenate are preferred. The concentration of the platinum metal and the second metal in the impregnating solution is selected to yield a finished catalytic composite containing from about 0.06 to about 2 weight percent platinum and about 0.1 to about 5 weight percent tin or rhenium.

The catalytic composites of the present invention are also prepared to contain a halogen component to enhance the acidic function of the catalyst. The halogen component may be fluorine, chlorine, iodine, bromine or mixtures thereof. Particularly preferred among these halogens are chlorine and fluorine, with chlorine being most preferred. The halogen may be added to the carrier material in any suitable manner at any time during the preparation process. Advantageously, at least part of the halogen component is provided in the impregnating solution by employing metal chlorides as starting materials; thus, for example, using the preferred chloroplatinic acid and stannous chloride will also provide at least part of the desired halogen component (chlorine). The halogen content of the finished composite may be further adjusted with an appropriate halogen or halogen acid (to raise halogen level) or with steam (to reduce halogen level) in preparing the catalyst for a particular use. For example, for use in reforming processes, the halogen content of a finished catalyst is preferably approximately 1 weight percent.

The catalytic components are adsorbed on the carrier material by soaking, dipping, suspending, or otherwise immersing the support material in the impregnating solution, suitably at ambient temperature. The support material is preferably contacted with the impregnating solution for a period of at least about 15 minutes, and then the impregnating solution is evaporated at an elevated temperature in order to coprecipitate the metallic components on the support. Thus, in a preferred embodiment, an impregnating solution is prepared by adding chloroplatinic acid and stannous chloride to a solution of oxalic acid, also adding HCl as desired to increase the dissolved chlorine content or adjust the pH, and mixing the solution with heating if necessary to dissolve all of the ingredients; adjusting the amount of water to obtain incipient wetting of the carrier; impregnating the carrier material, e.g., by spraying or dipping; maintaining contact between the carrier and the impregnating solution to obtain thorough interdispersion and to allow the contacted materials to equilibrate; drying the impregnated carrier material in air at an elevated temperature, e.g., up to about 135° C.; and finally calcining the dried catalytic composite in air or in an oxygen/nitrogen atmosphere.

This technique, employing a common solution of the metallic halogen components, is helpful in obtaining a uniform distribution of the components on the carrier surface, and also contributes to the desired co-precipitation of the metallic ingredients and their formation of metallic alloys on the carrier surface. X-ray diffraction and Moessbauer spectroscopic analyses of the platinum-tin catalytic composites of this invention may be used to discover the nature of the co-deposited metals and whether any solid metallic solutions or alloys have been formed.

The calcination of the catalyst generally will take place in an oxidizing atmosphere at a temperature of from about 200° C. to about 650° C. Preferably, the catalytic composite particles are calcined in stages to minimize breakage and sintering of the metallic components. Accordingly, the dried catalytic composite is first calcined for about 1–3 hours at a temperature of about 250°–350° C., and thereafter the temperature is increased to a temperature of about 500°–650° C. and held for a period of about 3–5 hours. Most preferably, the dried composite will be preheated gradually up to about 100° C., held for an hour, heated to about 250°–270° C. in a mildly oxidizing atmosphere (e.g., 1% oxygen in nitrogen) and held for an hour, then finally heated in air up to a temperature of about 525° C and held at that temperature for about 3 hours.

The resulting calcined catalytic composite will be subjected to a reduction step prior to use in the conversion of hydrocarbons. This typically involves heating the catalyst in pure dry hydrogen at a temperature of about 450°–525° C. for about 1–2 hours.

The catalytic composites of the present invention may be used in reforming gasoline feedstocks by contacting them with the catalyst at a pressure from about 50 to about 1000 psig, at a temperature of about 400°–600° C. The catalysts of the present invention exhibit stability under reforming conditions that is equivalent to or greater than that of conventional catalysts. The catalytic composites of the present invention allow stable operation at comparatively lower pressures than have been employed in continuous reforming operations and for longer periods without the need of regenerating the catalyst. Thus, the catalytic composites of the present invention permit continuous reforming to be conducted at low pressures, i.e., about 50–350 psig, for an extended catalyst lifetime before regeneration is necessary.

Similarly, the temperature employed for reforming processes with the catalytic composite of the present invention is generally lower than that in a similar reforming operation using a conventional platinum-containing catalyst. This significant and desirable feature of the present invention is a consequence of the selectivity of the catalytic composite of the present invention for the octaneupgrading reactions that preferably take place in a typical reforming operation. The initial selection of the temperature for a reforming operation typically is made as a function of the desired octane of the reformate product in view of the physical characteristics of the charge stock and of the catalyst. The temperature is often slowly increased during the run to compensate for the deactivation of the catalyst that usually occurs while maintaining production of a constant octane product. Hence, it is a feature of the catalytic composites of the present invention that the rate at which the temperature is increased in order to maintain a constant octane product is significantly lower than for a prior art reforming catalyst. In addition, the $C_{5+}$ loss in yield for a given temperature increase is substantially lower when the catalytic composites of the present invention are used than that for a conventional reforming catalyst. Further, the hydrogen production is substantially higher when the catalytic composites of the present invention are used.

Although the catalytic composite of the present invention has been described in terms of a reforming process, it may also be used to promote other hydrocarbon conversion reactions, including hydrocarbon cracking, isomerization, dehydrogenation, etc. Reaction conditions employed in these different hydrocarbon conversion reactions are well known in the art.

The U.S. patents referred to above are incorporated herein by reference.

The following examples are given to illustrate further the preparation of the catalytic composites of the present invention and the use thereof in the conversion of hydrocarbons. It is to be understood that the examples set forth hereinbelow are presented solely for the purpose of illustration and should not be construed as a limitation in any way of the general scope and spirit of claims which follow.

EXAMPLE I

Pt-Sn and Pt catalysts were prepared on three different supports.

Support A was a spherical alumina support material available from Condea Chemie (Hamburg, West Germany) having the following characteristics: particle size, 1/16"; bulk density, 35 lb/ft$^3$; pore volume (Hg porosimetry) 0.79 cc/g in pores of diameter 40–150 Å and a BET surface area of 218 m$^2$/g. The N$_2$ pore volume was only 0.58 cc/g. Superpores were observed in the Scanning Electron Microscope ("SEM") micrographs of this product.

Support B was a conventional extruded alumina support with the following characteristics: particle size: 1/16"; bulk density 45 lb/ft$^3$; pore volume 0.48 cc/g in the 40–150 Å diameter range and a BET surface area of 206 m$^2$g. No "superpores" were observed in SEM micrographs of this carrier support.

Support C was also a commercially available carrier support material, low density alumina spheres (Alcoa XA-139SG, Pittsburgh). These spheres contain a Na$_2$O content of about 0.30 wt. %. Through multiple exchanges with ammonium nitrate, the sodium was reduced to less than about 50 ppm and then the spheres were calcined to an appropriate surface area. Other characteristics are: particle size 1/16"; bulk density 35 lb/ft$^3$; pore volume 0.66 cc/g and a BET surface area of 197 m$^2$/g. No superpores were observed in the SEM micrographs of this carrier.

PREPARATION OF PT-SN CATALYSTS 500 g of the alumina carrier was placed in a rotating coater. An impregnation solution was prepared by dissolving 85 g of oxalic acid in 350 ml of water and heating the solution until all of the acid became dissolved. Next 19.74 g of a 9.5% Pt solution of chloroplatinic acid was added to the impregnation solution and 2.86 g of stannous chloride dissolved in 20 ml of water was added. Next 8.4 g of hydrochloric acid was added and the resulting solution was heated to 50° C. The final volume of the impregnating solution was adjusted by adding more water as needed to effect an incipient wetness impregnation of the support. The resulting mixture was heated to 85° C. and sprayed onto the alumina support. The impregnated support was then permitted to "age" for 16 hours at room temperature to equilibrate. The catalytic composite was air dried at 135° C. for 3 hours on a vibrating disk.

The dried catalyst was then calcined in an adiabatic calciner in three steps. First, the catalytic composite was heated in a 0.7-1.0 volume % oxygen in nitrogen mixture to 200° C. and held at this temperature for one hour. Second, the composite was heated to 270° C. and held there for one hour. The calcining atmosphere was then switched to flowing air, heated to 523° C and calcined at this temperature for 3 hours. The physical and chemical properties of the three catalytic composites are reported in Table I.

TABLE I

Physical and Chemical Properties of Pt—Sn Catalysts

|  | A | B | C |
|---|---|---|---|
| Pt, Wt % | 0.39 | 0.36 | 0.37 |
| Sn, Wt % | 0.32 | 0.31 | 0.31 |
| Cl, Wt % | 0.90 | 0.81 | 0.72 |
| BET Surface Area m$^2$/g | 219 | 208 | 197 |
| Pore Volume (N$_2$) cc/g | 0.58 | 0.54 | 0.68 |
| 25 Å-150 Å | 0.48 | 0.45 | 0.32 |
| 150 Å-600 Å | 0.10 | 0.09 | 0.36 |
| Pore Volume (Hg) cc/g | 0.79 | 0.51 | 0.76 |
| 35 Å-150 Å | 0.59 | 0.36 | 0.25 |
| 150 Å-600Å | 0.20 | 0.12 | 0.43 |
| 600 Å-20K Å | 0.00 | 0.02 | 0.08 |
| "Superpores" | PRESENT | NOT PRESENT | NOT PRESENT |

CATALYTIC EVALUATION

The catalytic Pt-Sn composites were evaluated for their activity and selectivity for naphtha reforming using a highly paraffinic feed, the properties of which are shown in Table II.

TABLE II

FEEDSTOCK INSPECTION

| PNA | Vol. % |
|---|---|
| Paraffins | 68.0 |
| Naphthenes | 14.7 |
| Aromatics | 17.3 |
| Bromine No. (cc/g) | ≦1.0 |

| DISTILLATION, ASTM D-86 | |
|---|---|
| Vol. % | °F. |
| IBP | 208 |
| 10 | 238 |
| 20 | 250 |
| 50 | 275 |
| 90 | 315 |
| 95 | 340 |
| FBP | 395 |
| GRAVITY, °API. 60° F. | 57.8 |
| DENSITY @ 15° C., g/ml | 0.7472 |
| MOLECULAR WEIGHT (ESTIMATED) | 117.2 |
| SULFUR, wppm | 0.24 |

Prior to testing, the catalytic composites were treated in situ at 950° F. with a flowing mixture of 5% oxygen in nitrogen for five hours. Calculated amounts of carbon tetrachloride were injected into the above gaseous stream to bring the catalyst chloride level to 1.0% after the reduction step. Thereafter, the catalyst was reduced by contacting it with hydrogen at 900° F. for three hours. The hydrocarbon was fed through the catalyst bed at a weight hourly space velocity of 2, a pressure of 100 psig, a hydrogen to hydrocarbon molar ratio of 6.0 and a temperature sufficient to maintain C$_{5+}$ liquid RON of 98, starting at 890° F. Catalytic performance data plots are shown in FIGS. 1 and 2.

Figure 2:
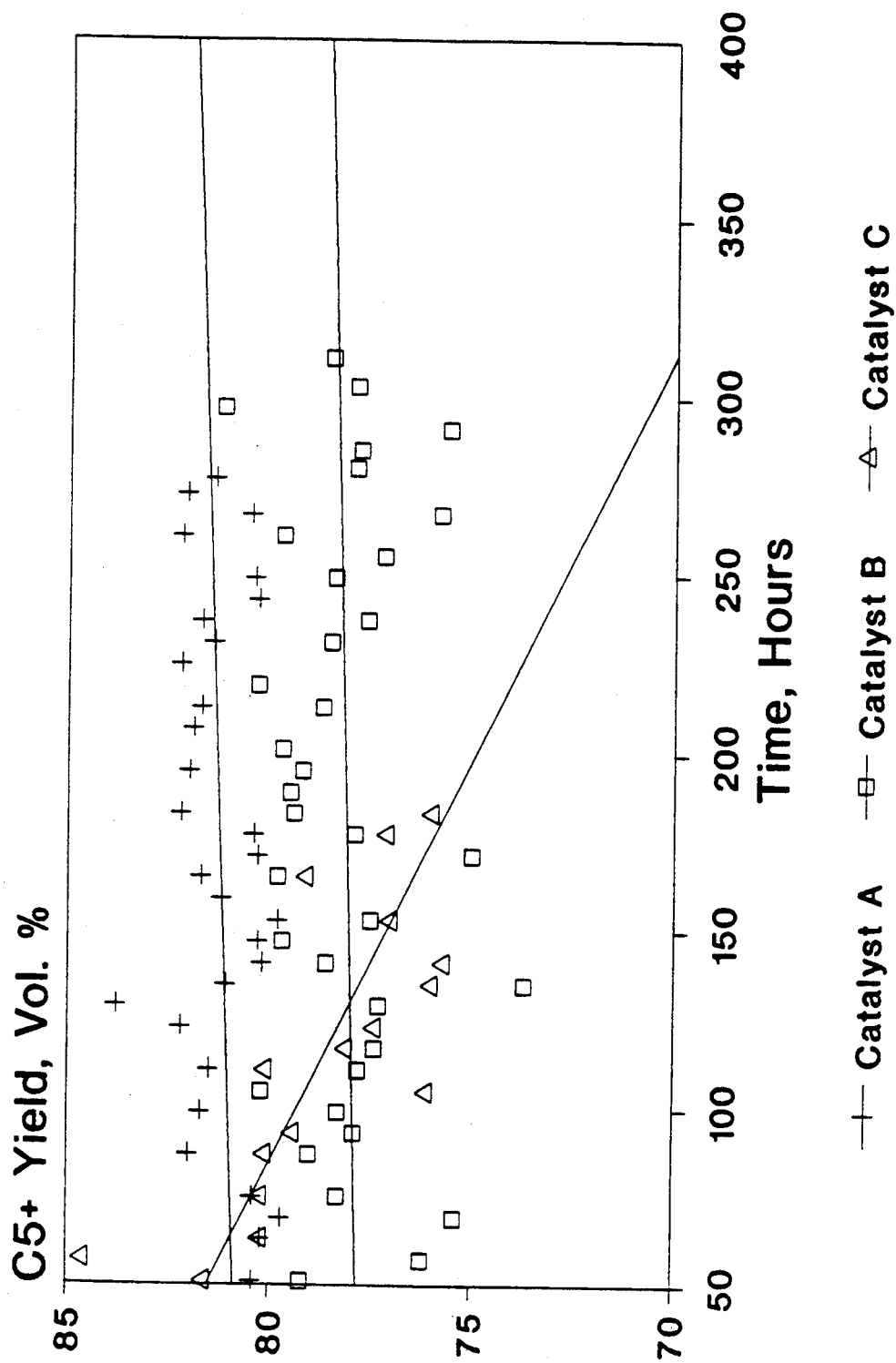
FIG. 2 shows a comparison of $C_{5+}$ yield over time between a platinum-tin catalytic composite according to the present invention, a conventional platinum-tin catalyst on an extruded support, and a conventional platinum-tin catalyst on a spherical alumina support.

In FIG. 1, the reaction temperature needed to maintain the product RON of 98 is plotted versus hours on oil. From this figure it may be determined that the activities of catalysts A and B are essentially equivalent, however the catalyst C is much less active. Also the catalysts A and B show, equivalent stability. The graph in FIG. 2 demonstrates the C$_{5+}$ liquid yields as a function of time. It can be seen here that the Catalyst A of this invention produces about four volume percent higher liquid yield, and a concurrent decrease in the light gases (C$_1$-C$_4$) yield is also observed. In addition, the hydrogen yield of the catalyst of this invention (A) is greater than that of catalysts B and C, which do not contain superpores. This is an additional advantage of the catalyst of this invention.

An unexpected result is that the Pt-Sn catalyst based on support A of this invention shows improved performance over the conventional support B. Pt-Sn catalyst based on support C is less active than A and has poorer stability then either A or B.

EXAMPLE II

Pt and Pt-Re catalysts were each prepared on the alumina support of the present invention. The catalytic performance of the catalytic composites of the present invention was compared with conventional Pt and Pt-Re catalysts.

The support for catalysts D and F of this invention was obtained in the form of spheres from Condea Chemie (Hamburg, West Germany) having the following characteristics: particle size, 1/16"; bulk density, 35 lb/ft$^3$; pore volume (Hg porosimetry) 0.79 cc/g in pores of diameter 40-150 Å and a BET surface area of about 220 m$^2$/g.

The physical and chemical properties of the Pt and Pt-Re catalysts are reported in Tables III and IV, respectively.

TABLE III

Physical and Chemical Properties of Pt Reforming Catalysts

|  | D | E |
|---|---|---|
| Pt, wt % | 0.34 | 0.38 |
| Particle Size, inch | 1/16 | 1/16 |
| Bulk Density g/cc | 0.55 | 0.55 |
| Crush Strength lb/sph | 9 | 7 |
| Surface Area m$^2$/g | 220 | 187 |
| Pore Volume (N$_2$) cc/g | 0.58 | 0.64 |
| 25 Å-150 Å | 0.48 | 0.44 |
| 150 Å-600 Å | 0.10 | 0.20 |
| Pore Volume (Hg) cc/g | 0.79 | 0.65 |
| 35 Å-150 Å | 0.59 | 0.30 |
| 150 Å-600 Å | 0.20 | 0.33 |
| 600 Å-20K Å | 0.00 | 0.02 |
| "Superpores" | PRESENT | NOT PRESENT |

TABLE IV

Physical and Chemical Properties of Platinum-Rhenium Catalysts

|  | F | G |
|---|---|---|
| Pt, wt % | 0.21 | 0.22 |
| Re, wt % | 0.36 | 0.42 |
| Cl, wt % | 0.98 | 1.19 |
| Particle Size, inch | 1/16 (Sph) | 1/16 (Extr) |
| Bulk Density g/cc | 0.55 | 0.75 |
| Crush Strength lb/sph | 9 | 8 |
| Surface Area m$^2$/g | 221 | 209 |
| Pore Volume (N$_2$) cc/g | 0.79 | 0.48 |
| 25 Å–150 Å | 0.48 | 0.47 |
| 150 Å–600 Å | 0.10 | 0.01 |
| Pore Volume (Hg) cc/g | 0.79 | 0.47 |
| 35 Å–150 Å | 0.59 | — |
| 150 Å–600 Å | 0.20 | — |
| 600 Å–20K Å | 0.00 | — |
| "Superpores" | PRESENT | NOT PRESENT |

PREPARATION OF PT CATALYSTS

The Pt catalysts were prepared using a conventional procedure utilizing a chloroplatinic acid solution saturated with carbon dioxide gas. The impregnated support was air dried at 135° C. and then calcined at 523° C. for 3 hours. The comparative sample (E) was also a commercially available carrier material, low density alumina spheres (Alcoa XA-139SG, Pittsburg). These spheres contain a Na$_2$O content of about 0.30 wt. %. The sodium was reduced to below 50 ppm and the spheres calcined to an appropriate surface area. Other properties are given above in Table III.

PREPARATION OF PT-RE CATALYSTS 250 g of the alumina carrier was placed in a rotating coater. An impregnation solution was made by dissolving 1.5 g of ammonium perrhenate in 20 ml of water, followed by the addition of 5.8 g of chloroplatinic acid solution (9.5 % Pt) in 20 ml of water and 4.5 g of ammonium hydroxide dissolved in 20 ml of water. Then the resulting mixture was heated to 85° C. and 6.60 g of 37% HCl were added to the clear solution. The final volume of the impregnating solution was adjusted by adding more water as needed to effect an incipient wetness impregnation. The resulting solution was sprayed on the alumina support and the impregnated support was allowed to age for ½ hour at room temperature. The catalytic composite was air dried at 135° C. for 3 hours. The dried catalyst was then calcined in an adiabatic calciner in flowing air at 523° C. for 3 hours. Comparative sample G was a commercial Pt-Re catalyst on an extruded support, obtained from Engelhard Corporation (E-803).

CATALYTIC EVALUATION

The Pt catalytic composites were evaluated for activity and selectivity for naphtha reforming using a naphthenic feed, properties of which are shown in Table V.

TABLE V

| FEEDSTOCK INSPECTION | |
|---|---|
| PNA | Vol. % |
| Paraffins | 54.7 |
| Naphthenes | 36.6 |
| Aromatics | 8.7 |
| Bromine No. (cc/g) | ≦0.5 |
| DISTILLATION, ASTM D-86 | |

TABLE V-continued

| Vol. % | °F. |
|---|---|
| IBP | 174 |
| 10 | 188 |
| 20 | 194 |
| 50 | 210 |
| 90 | 252 |
| 95 | 265 |
| FBP | 296 |
| GRAVITY, °API. 60° F. | 59.4 |

Prior to testing, the catalytic composites were treated in situ at 950° F. with a flowing mixture of 5% oxygen in nitrogen for five hours. Calculated amounts of carbon tetrachloride were injected into the above gaseous stream to bring the catalyst chloride level to 1.0% after reduction. The catalyst was then reduced by contacting it with hydrogen at 900° F. for three hours. The hydrocarbon feed was passed through the catalyst bed at a liquid hourly space velocity of 1.5, at a pressure of 175 psig, a hydrogen to hydrogen molar ratio of 3.0 and a temperature sufficient to maintain C$_{5+}$ liquid RON of 96. Five ppm by weight of sulfur were added to the feed.

The Pt-Re catalytic composites were evaluated for activity and selectivity for naphtha reforming using a paraffinic feed, properties of which are shown in Table II (supra).

Prior to testing, the catalytic composites were treated in situ at 950° F. with a flowing mixture of 5% oxygen in nitrogen for five hours. Calculated amounts of carbon tetrachloride were injected into the above gaseous stream to bring the catalyst chloride level to 1.0% after reduction. Thereafter, the catalyst was reduced by contacting it with hydrogen at 900° F. for three hours. The Pt-Re catalyst was also presulfided to a level of 0.13% sulfur by treating the catalytic composite with a gas mixture containing H$_2$S and hydrogen at 900° F. The hydrocarbon feed was passed through the catalyst bed at a weight hourly space velocity of 4, at a pressure of 255 psig, a hydrogen to hydrocarbon molar ratio of 4.0 and a temperature sufficient to maintain C$_{5+}$ liquid RON of 98. Catalytic performance data plots for the Pt catalysts are shown in FIGS. 3 and 4, and for Pt-Re catalysts in FIGS. 5 and 6.

Figure 3:
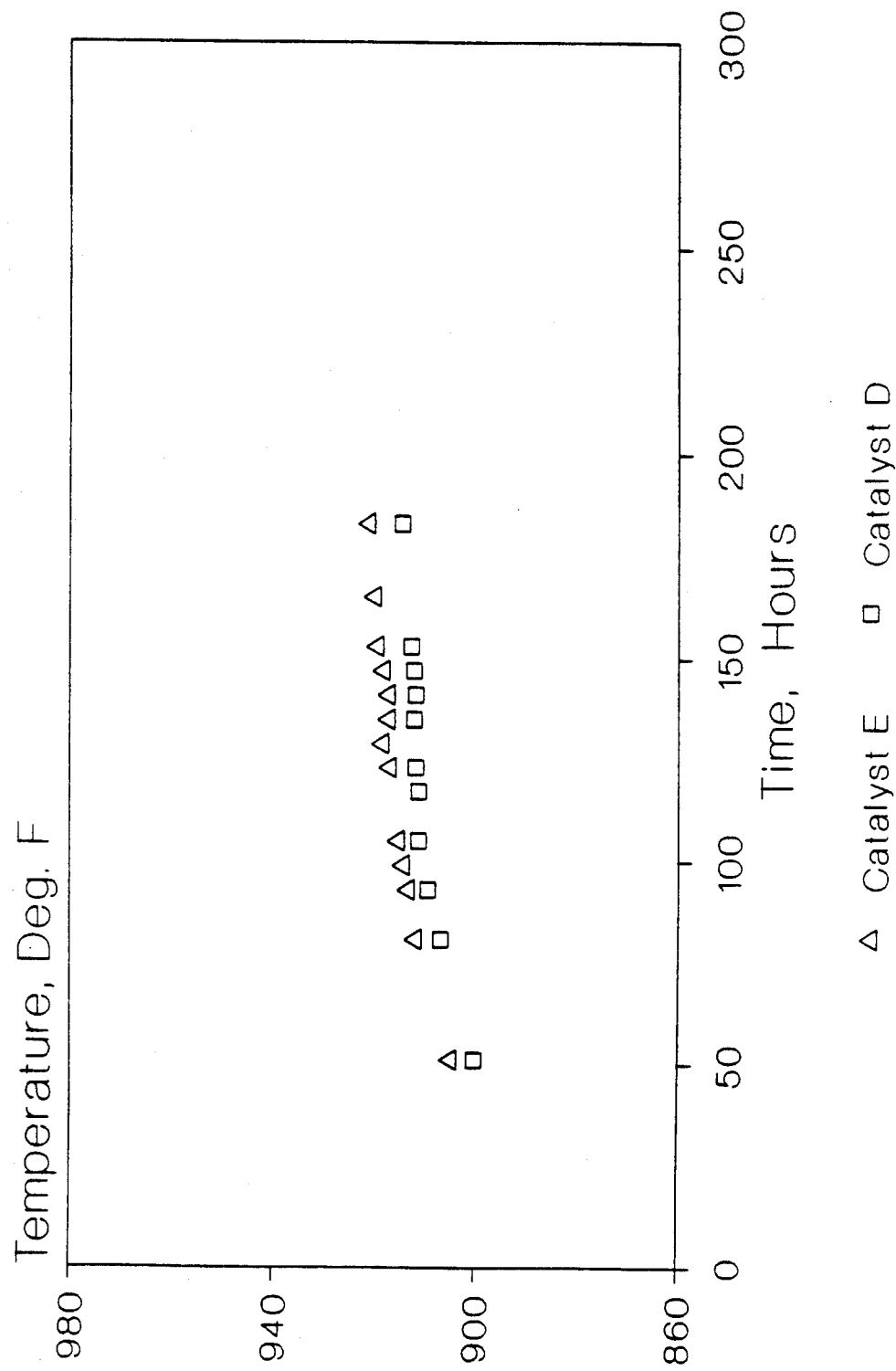
FIG. 3 shows a comparison between catalytic performance of a platinum catalyst according to the invention, and a conventional platinum catalyst in terms of reaction temperature necessary to maintain the 96 RON product plotted versus hours on oil.
Figure 4:
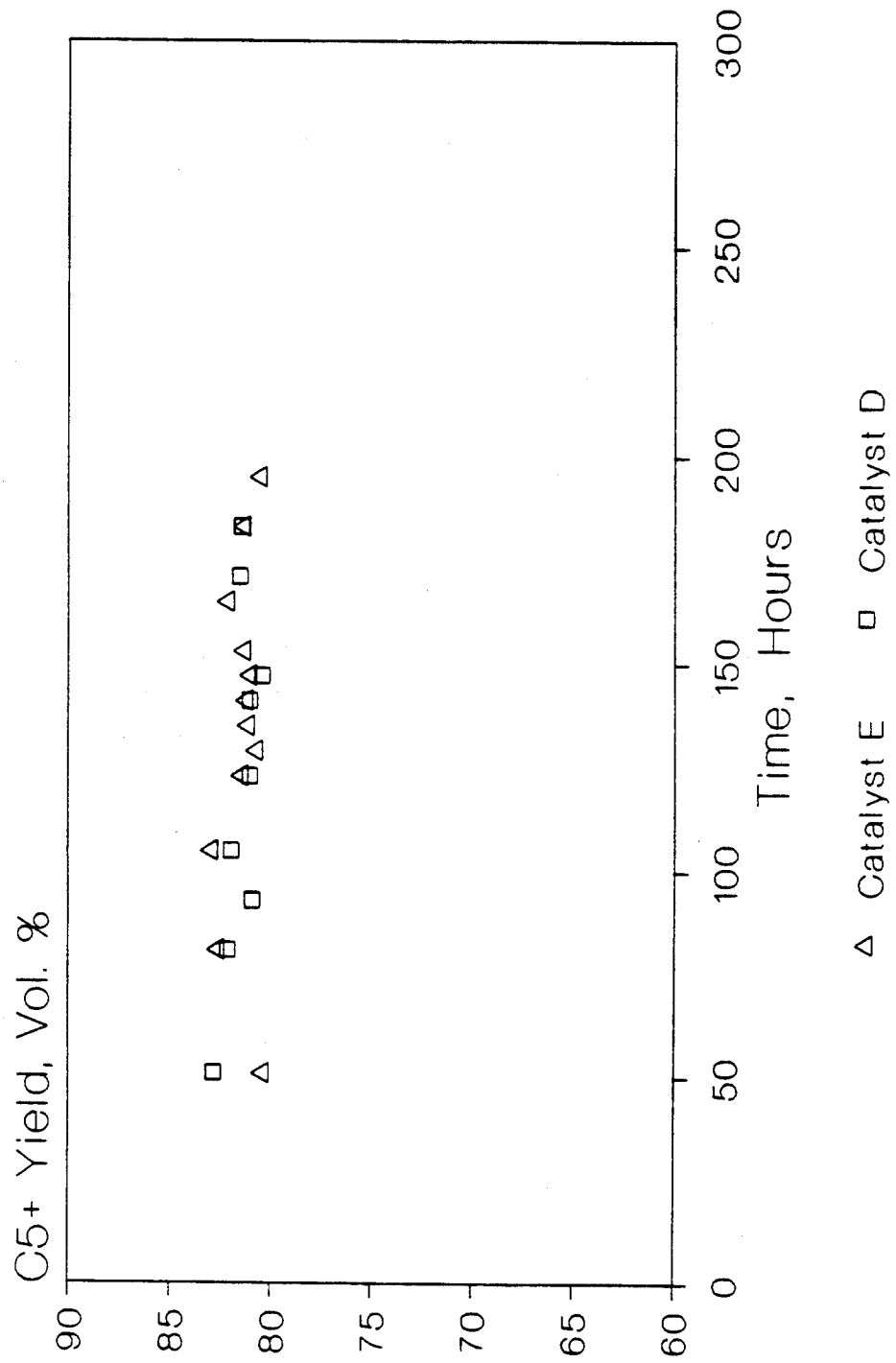
FIG. 4 shows a comparison of $C_{5+}$ hydrocarbon yields of a platinum catalyst of the invention and a conventional platinum catalyst.

In FIG. 3, the reaction temperature needed to maintain the product RON of 96 is plotted versus hours on oil. From this figure it may be determined that the catalyst D was more active than catalyst E, despite the higher metal loading of catalyst E. The graph in FIG. 4 demonstrates the C$_{5+}$ liquid yields as a function of time. It can be seen here that the catalyst D of this invention produces about the same liquid yield at a lower metal loading. Also, yield in aromatics was higher in catalyst D. The hydrogen purity (H$_2$/C$_1$-C$_4$) of the catalyst of the invention (D) was greater than that of catalyst E, which did not contain superpores.

Figure 5:
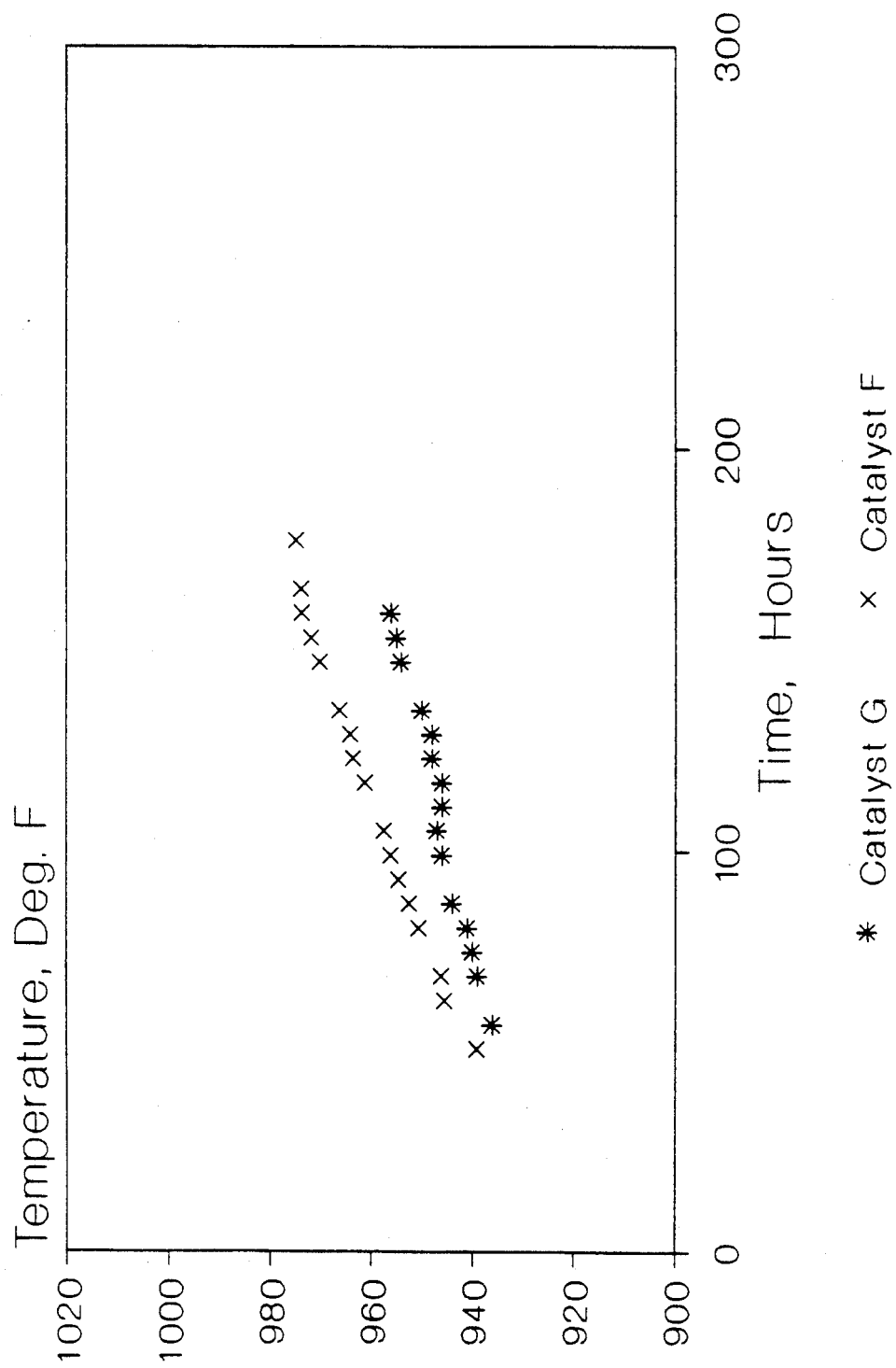
FIG. 5 shows a comparison between catalytic performance of a platinum-rhenium catalyst according to the invention, and a conventional platinum-rhenium catalyst in terms of reaction temperature necessary to maintain the 98 RON product plotted versus hours on oil.
Figure 6:
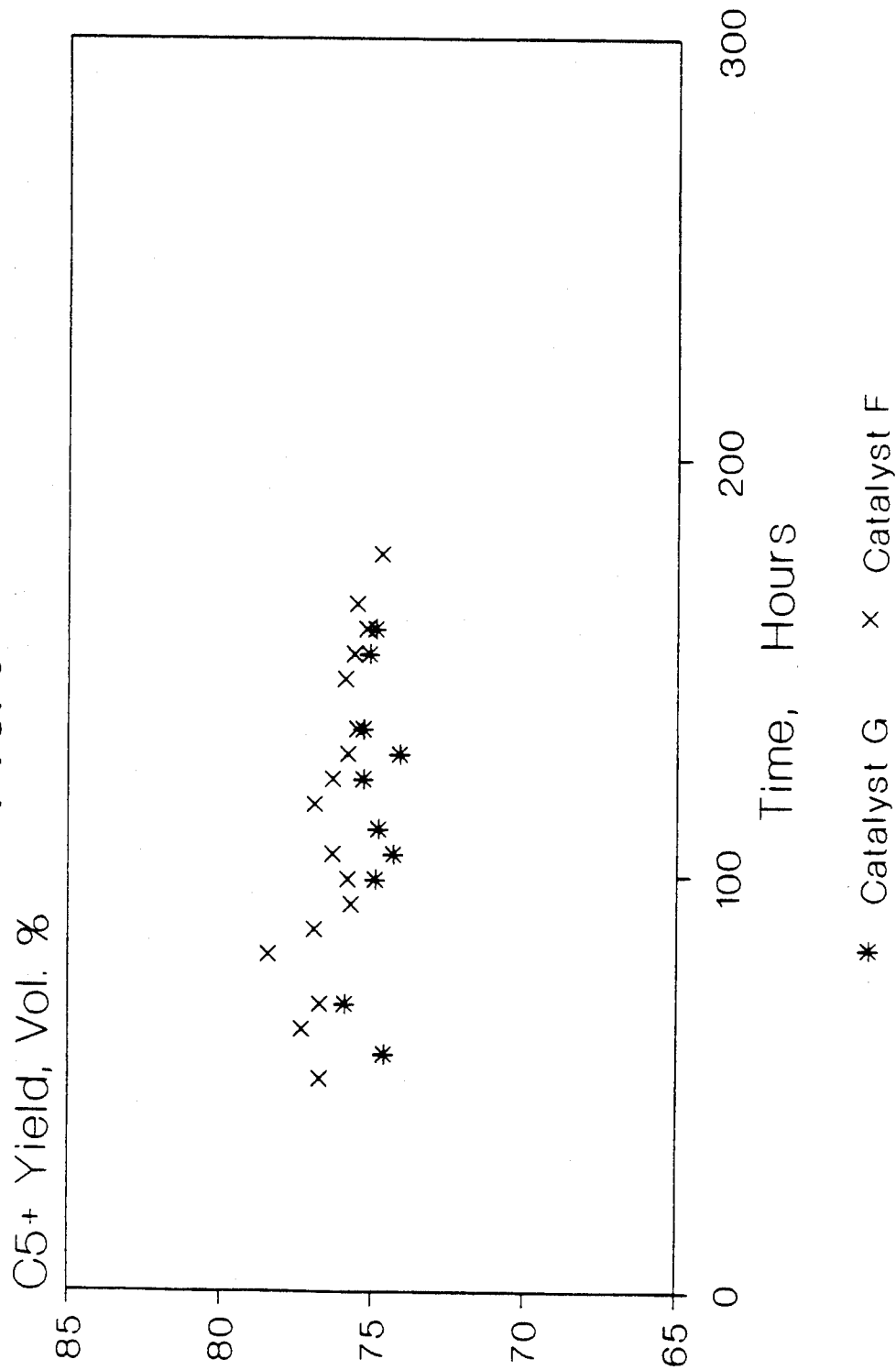
FIG. 6 shows a comparison of $C_{5+}$ hydrocarbon yields in a platinum-rhenium catalyst of the invention and a conventional platinum-rhenium catalyst.

In FIG. 5, the reaction temperature needed to maintain the product RON of 98 is plotted versus hours on oil. From this figure it appears that the activities of catalysts F and G differ, probably due to a higher chlorine content in catalyst G. The graph in FIG. 6 demonstrates the C$_{5+}$ liquid yields as a function of time. It can be seen here that the catalyst F of this invention produces a significantly higher cycle average liquid yield, and a concurrent decrease in the light gases (C$_1$–C$_4$) yield.

The appended claims are intended to cover all obvious variations and modifications of the embodiments described above that would be self-evident to a person of ordinary skill in the catalytic reforming art.

We claim:

1. A catalytic composite comprising a combination of a platinum component, optionally a second metal component selected from tin, cobalt, nickel, copper, palladium, germanium, or rhenium, and a halogen component with a porous carrier material, wherein the components are present in amounts sufficient to result in the catalytic composite containing, on an elemental basis, about 0.06 to about 1 wt. percent platinum metal, about 0.1 to about 1 wt. percent of said second metal if present, and about 0.1 to about 3.5 wt. percent halogen, wherein the metallic components are substantially uniformly distributed throughout the porous carrier support material, and wherein the porous carrier material is a spherical gamma alumina having a total mercury pore volume of about 0.60 to about 0.95 cc/g, a total nitrogen pore volume of about 0.35 to about 0.65 cc/g, a fresh BET surface area of about 170 m$^2$/g to about 240 m$^2$/g, and wherein the porous carrier material further comprises a pore structure having superpores with a pore diameter of about 200–10,000 or greater nm and mesopores with a pore diameter of about 5–20 nm interconnected therewith, and wherein at least 80% of the total nitrogen pore volume resides in pores under 150 Å in diameter.

2. A catalytic composite according to claim 1, wherein the second metal is tin.

3. A catalytic composite according to claim 2, wherein the halogen is chlorine.

4. The catalytic composite according to claim 3, wherein the components are present in amounts sufficient to result in a catalytic composite containing, on an elemental basis, about 0.2–0.4 wt. % of the platinum metal, about 0.2–0.5 wt. % tin, and about 0.6–1.2 wt. % of chlorine.

5. The catalytic composite according to claim 5, wherein the chlorine is present in an amount of about 0.85–1.1 wt. %.

6. The catalytic composite according to claim 2, wherein the halogen component is fluorine.

7. The catalytic composite according to claim 1, wherein the components are present in amounts sufficient to result in a catalytic composite containing, on an elemental basis, about 0.2–0.4 wt. % platinum, about 0.2–0.5 wt. % of rhenium, and about 0.6–1.2 wt. % chlorine, said composite additionally containing a sulfur component in an amount sufficient to result in a catalytic composite containing about 0.05 to about 0.5 wt. % sulfur.

8. The catalytic composite according to claim 2, wherein at least a portion of the metallic ingredients in the composite are in the form of an alloy.

9. A bimetallic catalytic composite comprising a combination of a platinum component, a tin component, and a chlorine component with a porous spherical alumina carrier, wherein said components are present in amounts sufficient to result in the catalytic composite containing, on an elemental basis, 0.06–1.0 wt. percent platinum metal, 0.1–1.0 wt. percent tin, and 0.6–1.2 wt. percent chlorine, said metallic components being substantially uniformly distributed throughout the porous spherical alumina carrier, and wherein said porous spherical alumina carrier is of gamma alumina and has a total mercury pore volume of 0.60 to 0.95 cc/g, a total nitrogen pore volume of 0.35 to 0.65 cc/g, a fresh BET surface area of about 170 m$^2$/g to about 240 m$^2$/g, and wherein the porous spherical alumina further comprises a pore structure having superpores with a pore diameter of 200–10,000 nm and mesopores with a pore diameter of 5–20 nm interconnected therewith, and wherein at least 80% of the total nitrogen pore volume resides in pores of less than 150 Å in diameter.

10. The catalytic composite according to claim 9, wherein the total mercury pore volume is 0.7–0.8 cc/g, the total nitrogen pore volume is 0.45–0.55 cc/g, the surface area is 180–220 m$^2$/g, and wherein the superpore fractional surface is 0.2–0.7.

11. The catalytic composite according to claim 10, wherein the superpore fractional surface is 0.3–0.5.

* * * * *